(12) United States Patent
Kataoka

(10) Patent No.: US 6,705,471 B2
(45) Date of Patent: Mar. 16, 2004

(54) FILTER DEVICE FOR COFFEE OR THE LIKE

(75) Inventor: George Kataoka, Tokyo (JP)

(73) Assignee: Kataoka Bussan Kubushiki Kaisha, Tokyo (JP)

( * ) Notice: Subject to any disclaimer, the term of this patent is extended or adjusted under 35 U.S.C. 154(b) by 68 days.

(21) Appl. No.: 09/925,767

(22) Filed: Aug. 9, 2001

(65) Prior Publication Data
US 2002/0035928 A1 Mar. 28, 2002

(30) Foreign Application Priority Data

Sep. 28, 2000 (JP) ........................................ 2000-297294
Oct. 23, 2000 (JP) ........................................ 2000-322424

(51) Int. Cl.$^7$ ................................................. A47J 31/06
(52) U.S. Cl. ........................ 210/474; 210/473; 210/476; 426/77; 426/82; 426/111
(58) Field of Search ................................ 210/282, 473, 210/474, 475, 476, 481, 493.5, 502.1, 503, 497.3; 426/77–82, 111; 99/290, 295, 322; A23F 3/00; A47J 31/00, 31/06, 31/08; B65B 29/02

(56) References Cited

U.S. PATENT DOCUMENTS

| | | | | |
|---|---|---|---|---|
| 3,434,589 A | * | 3/1969 | Valtri et al. ................... | 206/218 |
| 3,823,824 A | * | 7/1974 | Close .............................. | 210/86 |
| 4,520,716 A | * | 6/1985 | Hayes ............................ | 99/306 |
| 4,867,993 A | * | 9/1989 | Nordskog ..................... | 426/77 |
| 5,894,786 A | * | 4/1999 | Miya .............................. | 99/306 |
| 6,103,116 A | * | 8/2000 | Koslow et al. .............. | 210/282 |
| 2002/0096055 A1 | * | 7/2002 | Heczko ....................... | 99/323.3 |

FOREIGN PATENT DOCUMENTS

| | | |
|---|---|---|
| JP | 07284447 | 10/1995 |
| JP | 10-127496 | 5/1998 |
| JP | 10234577 | 9/1998 |

* cited by examiner

Primary Examiner—Joseph Drodge
Assistant Examiner—Krishnan S Menon
(74) Attorney, Agent, or Firm—Butzel Long

(57) ABSTRACT

A filter device for coffee or the like which includes a container body consisting of an open frame and a blind-end frame including an annular bottom member, and a filter chamber for enclosing substance to be extracted and received in the annular bottom member via a filter, wherein the blind-end frame is adapted to be folded inside the open frame together with the filter chamber. The open frame is formed of sheet material having predetermined rigidity, such as thick paper, non-woven fabric, etc., while the blind-end frame is formed of deformable sheet material provided with shape retaining characteristic having predetermined rigidity and flexibility such as thin paper, non-woven fabric, etc. These open frame and the blind-end frame are connected so as to be folded. When the filter device is not in use, the blind-end frame is folded and pushed into the open frame while turned back to be stored inside the open frame together with the filter device. Thus, the filter device can be stored or transported in a compact state. For use, the blind-end frame may be expanded while pulling out the filter chamber, restored to the container body of a cup-like shape, and mounted on a coffee cup or the like to be poured with hot water.

35 Claims, 7 Drawing Sheets

FILTER DEVICE FOR COFFEE OR THE LIKE

BACKGROUND OF THE INVENTION

1. Field of the Invention

The present invention relates to a filter device of dripping type for extracting drinks such as coffee, tea, etc., and more particularly to the filter device comprising a container which includes a filter chamber for containing substance to be extracted such as ground coffee or the like, the container being adapted to be folded and stored in a compact state and suitable for simple treatment.

2. Description of the Related Art

There have been conventionally proposed, put into practice, and placed on market, a lot of filter devices for coffee of dripping type in which hot water is directly poured on ground coffee to extract coffee liquid.

In most of handy filter devices of disposable type for one person or a few people, ground coffee is integrally enclosed in the device in advance, and coffee liquid can be extracted simply by pouring hot water. Moreover, because the filter device of the type can be disposed of, after use, as a trash, it has been widely and conveniently used.

The filter device of this disposable type can be largely classified into two types. First is the filter device for coffee of the dripping type consisting of a filter chamber for containing ground coffee and a support for supporting and fixing the filter chamber at an edge of a coffee cup or the like, and in which coffee liquid is recovered after hot water has directly poured on the ground coffee contained in the filter chamber. Second is a filter device for coffee of tea bag type in which a filter bag containing ground coffee is dipped in hot water in a coffee cup. The former filter device of the dripping type includes a cup-like container for storing hot water in an amount corresponding to capacity of the coffee cup and the filter chamber for the ground coffee which is integrally assembled to the container. The hot water which has been once stored in the container is allowed to pass through the filter chamber to extract the coffee liquid.

However, the filter device for coffee of the dripping type has had such disadvantages that its body part formed in a cup-like shape for storing hot water is bulky, and production cost is relatively high in spite of disposable type. There has been another drawback that it is difficult to dispose of the filter device because of its material.

It has been a serious problem inter alia that the filter device of this type requires a larger space for storing, transporting or displaying in shops as compared with the coffee filter device of the tea bag type which can be folded into a compact state.

In order to solve the above described problems, there have been already proposed such coffee extractors as disclosed in Japanese Utility Model Publications Nos. 5-10766 and 5-40843.

In the former coffee extractor, a container body is provided with vertical pleats at a peripheral face of its lower half part, a folding line formed at an upper edge of the vertical pleats, and horizontal pleats in a radial direction at a stepped part which continuously forms a coffee filter chamber, thereby enabling the peripheral face of the lower half part of the container body to be folded by means of these vertical and horizontal pleats, and the folding line. In this manner, the container body can be folded into halves thus to store the coffee filter chamber inside the container body.

In the latter coffee extractor, a container body is also provided with vertical pleats at a peripheral face of its lower half part, a folding line formed at an upper edge of the vertical pleats, and an annular groove formed at an outer circumferential edge of a stepped part which continuously forms a coffee filter chamber. The container body will be folded at the folding line and the annular groove while being reduced in diameter by means of the vertical pleats thereby enabling the lower half part of the container body to be folded inside an upper half part. In this manner, the container body can be folded with the coffee filter chamber stored therein.

These two proposals aim to reduce a capacity of the coffee extractor into a half by folding the lower half of the container body having a cup-like shape into the upper half, thus making it compact, in order to solve the bulky state in the prior art. However, they have still such problems that the vertical and horizontal pleats must be formed on the peripheral face of the container body and the folding line must be formed at the upper edge of the vertical pleats in order to fold the container body. Further, in the latter proposal, the annular groove must be formed.

Formation of the vertical and horizontal pleats, the folding line, the annular groove, and so on has been inevitable means to be adopted, since synthetic resin material having rigidity has been selected in the two proposals to make the extractors. However, there has been a further problem that because folded configurations are defined by shapes and dimensions of the pleats, the folding line and the annular groove, and positional relations therebetween, and further because the folding operation is promoted through cooperation between the vertical pleats and the horizontal pleats, between the pleats and the folding line, and between the pleats and the annular groove, the folding and expanding operation must be conducted while making a balance between the above described parts.

There has been a still further problem in the above proposals that since the material must be synthetic resin for a reason of forming the pleats and the folding line, the device cannot be simply disposed of among trash in spite of disposable type.

OBJECTS OF THE INVENTION

It is an object of the present invention to provide a filter device for coffee and so on, which has excellent storing ability and transportability while containing therein substance to be extracted such as an appropriate amount of coffee, tea or the like, which can easily make extracted drinks of coffee, tea or the like, and which can be simply treated.

It is another object of the present invention to provide a filter device for coffee and so on, which can be stored in a compact shape, which can be easily expanded for use to such a size capable of receiving sufficient amount of hot water to be poured, and that, which can easily and reliably make tasty drinks such as formal coffee without employing extra tools which are annoying in treatment.

It is a further object of the present invention to provide a filter device for coffee and so on, which can be freely folded and expanded having excellent handling performance, which can be manufactured of paper or the like as raw material, and which can be simply disposed of after use without incurring disadvantages such as environmental contamination.

It is a still further object of the present invention to provide a filter device for coffee and so on, which has a rational structure suitable for mass production, and which can enjoy high productivity and excellent cost performance.

SUMMARY OF THE INVENTION

In order to attain the above described objects, there is provided according to the present invention, a filter device for coffee or the like comprising a container body consisting of an open frame formed of sheet material having predetermined rigidity, and a blind-end frame including an annular bottom member and connected to the open frame so as to be folded, the blind-end frame being formed of sheet material having predetermined flexibility, and a filter chamber for enclosing substance to be extracted and received in the annular bottom member via a filter, wherein the blind-end frame is adapted to be folded inside the open frame together with the filter chamber.

According to another aspect of the invention, the open frame is formed of sheet material in a tubular shape having predetermined rigidity, and the blind-end frame is formed of deformable sheet material in a tubular shape to which is given shape retaining characteristic having predetermined rigidity and flexibility.

The filter chamber is preferably has an outer diameter which is smaller than an inner diameter of a cup to be applied. The blind-end frame has such a size as surrounding the filter chamber, and the open frame has such a size as surrounding the blind-end frame. By folding the open frame and the blind-end frame at a folding area between them, the filter chamber and the blind-end frame can be stored inside the open frame.

Preferably, the open frame, the blind-end frame and the filter chamber have substantially the same height. When the open frame, the blind-end frame and the filter chamber are folded, they will be contracted into a size of the open frame. In this state, the filter device can be made compact, and easily stored and packed.

According to a further aspect of the invention, the height of the blind-end frame may be substantially twice as high as the height of the open frame, and an upper half of the blind-end frame is attached to an inner peripheral face or an outer peripheral face of the open frame, thus reinforcing the open frame. In this case too, the open frame, the blind-end frame and the filter chamber may have substantially the same height.

The blind-end frame presents a substantially tubular shape when expanded outward of the open frame, and can receive sufficient amount of hot water in use. In the expanded state, the container body may have a varied diameter gradually reduced from the open frame to the blind-end frame into a substantially inverted shape of a truncated cone.

According to a still further aspect of the invention, a reinforcing frame having predetermined rigidity may be formed at a circumferential edge of a bottom of the blind-end frame.

Preferably, the reinforcing frame is extended downward from the bottom of the blind-end frame thereby to integrally form a cup holding frame.

According to a still further aspect of the present invention, the open frame and the reinforcing frame provided at the circumferential edge of the bottom are integrally connected by means of a plurality of connecting pieces. Since the blind-end frame, the reinforcing frame and the open frame are made integral by means of the connecting pieces, a plurality of windows can be formed by stamping, leaving the connecting pieces, in a lower half of the cup-shaped container body having the annular bottom. A body part of the blind-end frame which is flexible and deformable may be attached to the inner peripheral face of the cup-shaped container body thereby to cover the windows from the inside.

By providing the body part of the blind-end frame with the connecting pieces, it has become possible to realize stable folding and expansion of the filter chamber, the blind-end frame and the open frame.

According to a still further aspect of the present invention, the open frame is formed of thick paper having predetermined rigidity, and a body part of the blind-end frame is formed of deformable thin paper provided with shape retaining characteristic having predetermined rigidity and flexibility.

According to a still further aspect of the present invention, the open frame is formed of non-woven fabric having predetermined rigidity, and a body part of the blind-end frame is formed of deformable non-woven fabric provided with shape retaining characteristic having predetermined rigidity and flexibility.

The filter device according to the present invention can be used as the filter device of the dripping type by expanding the container body into a cup-like shape and mounting it on a coffee cup or the like, into which hot water is simply poured. When the filter device is not in use or prior to use, the blind-end frame of the container body can be pushed into the open frame together with the filter chamber. Therefore, the filter device has such advantages that it can be contracted into a compact shape, easily packed, and will not take spaces for storing, transporting or displaying in shops etc.

Moreover, the filter device according to the present invention can be simply and easily manipulated for contraction by pushing the blind-end frame into the open frame by means of flexibility of its body part, and can be also smoothly expanded for use without any resistance.

Further, since all the area of the body part is deformable, there is no need of providing a specific folding position such as the folding line, pleats, etc. in the conventional cases. Therefore, it is advantageous that smooth contracting and expanding operation can be realized according to the invention.

Other objects, features of the present invention will be made apparent from the following description with reference to the accompanying drawings.

DESCRIPTION OF THE PREFERRED EMBODIMENTS

Figure 1:
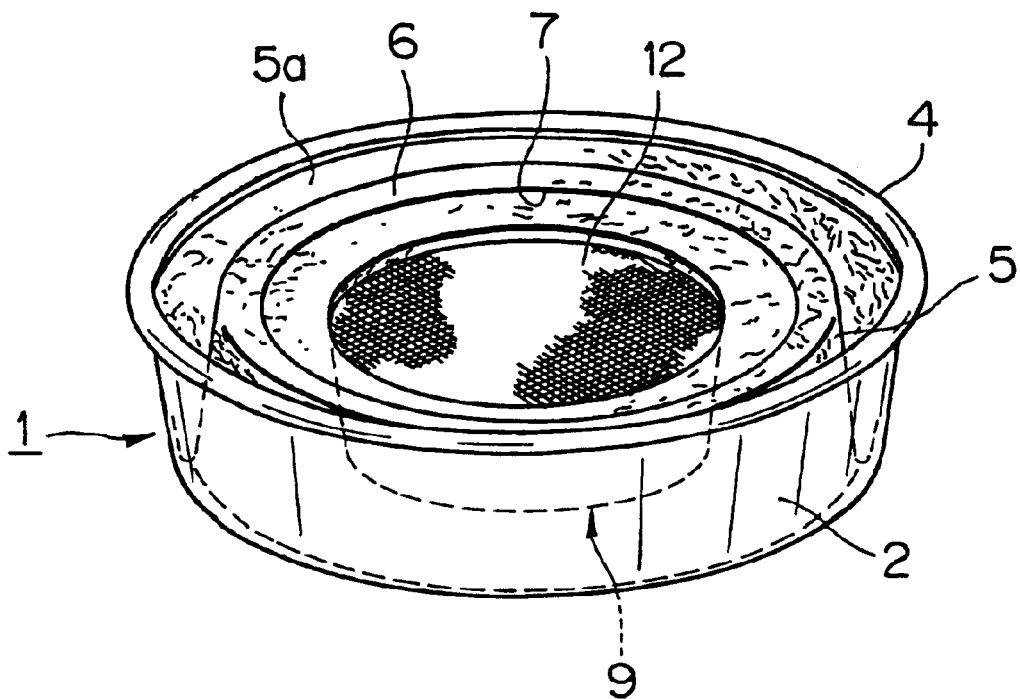
FIG. 1 is a perspective view of a filter device according to a first embodiment of the present invention in a folded state.

Now, the embodiments of the present invention will be described referring to the attached drawings. Although the invention will be described referring to a filter device especially for dripping coffee which is capable of extracting coffee liquid from ground coffee, it is apparent that objects to be extracted is not restricted to coffee only, but they may include various types of tea including red tea, and any substance which can be extracted by means of water, hot water or other liquid.

First Embodiment

As shown in FIGS. 1 to 4, a filter device in the first embodiment according to the present invention includes a container body 1 consisting of an open frame 2 and a blind-end frame 3 having an annular bottom member 6, and a filter chamber 9 which is formed in the annular bottom member 6 and contains substance 8 to be extracted in a sealed manner.

The open frame 2 constitutes a substantially upper half part of the container body 1. The blind-end frame 3 constitutes a lower half part of the container body 1, and is connected to the open frame 2 so as to be folded.

The container body 1 is formed in a cup-like shape which has a sufficient capacity for storing hot water corresponding to the number of persons to be served with coffee (for example, for one person in case of the filter device for one person) The open frame 2 in the upper part is formed in a cylindrical shape having such a size as occupying almost the upper half portion of the cup-shaped container body 1.

The open frame 2 is given shape retaining characteristic so as to stably maintain the shape of the cup-shaped container body 1. In this embodiment, the open frame 2 is formed of thick paper material having such rigidity as capable of retaining the cylindrical shape when the open frame 2 is grasped with a thumb and an index finger applied to its outer surface after hot water has been poured in the container body 1, without collapsing the cylindrical shape by the grasp.

This open frame body 2 is formed in a short cylindrical shape substantially having an inverted shape of truncated cone which is reduced in diameter in a downward direction, and adapted to receive the blind-end frame 3 which extends downward and adapted to be folded into the open frame 2 as described below. An upper edge of the open frame 2 is folded back to form a ring-like reinforcing edge 4, thus enhancing strength of the entire structure.

The aforesaid blind-end frame 3 is integrally formed with the open frame 2 to constitute the container body 1. In this embodiment, contrarily to the open frame 2, the blind-end frame 3 is formed of thin paper material which has a smaller thickness than the open frame 2 and which is flexibile and can be easily deformed, but still having desired shape retaining characteristic.

In this embodiment, the blind-end frame 3 consists of a body part 5 and the bottom 6 which are integrally formed with each other. There is provided in a center part of the bottom 6 a round hole 7 communicating with the filter chamber 9 which is continuously formed at a lower face of the bottom 6 and contains the substance 8 to be extracted such as ground coffee.

The aforesaid body part 5 of the blind-end frame 3 has a height substantially a half of a total height of the container body 1 and equal to a height of the open frame 2. An upper edge of the body part 5 is integrally joined to a lower end edge 10 of the open frame 2. However, in this embodiment, the upper edge of the body part 5 is extended along an inner peripheral face of the open frame 2 up to an upper open end edge thereof, and an extended portion 5a is joined to the inner peripheral face of the open frame 2 so that the open frame 2 having rigidity may surround the extended portion 5a of the body part 5 of the blind-end frame 3 in order to reinforce, and at the same time, to integrate both the members.

The aforesaid filter chamber 9 is formed in a cylindrical shape having a smaller size than the aforesaid blind-end frame 3. A filter 12 is stretched over an upper face of a body part 11 of the filter chamber 9 in the cylindrical shape in order to close the hole 7 and to separate the filter chamber from the container body 1. Another filter 13 is stretched over a lower face of the body part 11 in the same manner in order to close the bottom and to contain the substance 8 to be extracted such as ground coffee or the like inside.

This filter chamber 9 may be formed of filter material in its entirety including the body part 11, and may be formed in a shape of a bag, besides the cylindrical or tubular shape.

Although it is required that the filter chamber 9 is smaller than the aforesaid open frame 2 because the filter chamber 9 must be stored inside the open frame 2 as will be described below, it is also required naturally that the filter chamber 9 has such a capacity as enclosing and holding the ground coffee or the like in an amount necessary for the number of persons to be served.

Figure 2:
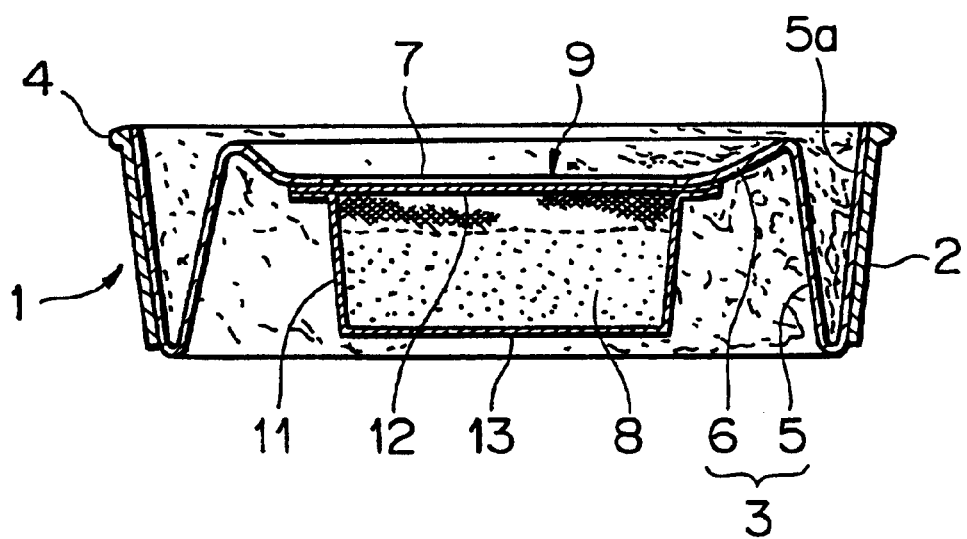
FIG. 2 is a sectional front view taken along a center line of the filter device of FIG. 1 in a folded state.

The filter device according to the present invention is constructed as described above, and in a state after manufactured and before use, the blind-end frame 3 is folded into the open frame 2 of the container body 1 as shown in FIGS. 1 and 2, and at the same time, the filter chamber 9 provided at the lower face of the blind-end frame 3 is pushed into the open frame 2 so that the entire filter device may be folded and reduced in size substantially to the height of the open frame 2.

Contraction of the container body 1 can be performed by pushing up the filter chamber 9. By pushing up the filter chamber 9 projecting from the bottom 6 of the container body 1 which has been enlarged in a cup-like shape, the bottom 6 will be elevated accordingly. With this elevation of the bottom 6, the body part 5 of the blind-end frame 3 having flexibility starts to be folded inside from its lower edge, and continues to be pushed up. Then, the folded position of the body part 5 will be gradually displaced upward and introduced into an interior of the open frame 2. When the folded position has reached the lower end edge 10 of the open frame 2, the elevation will be stopped at this limit, thus completing the contraction and the folding operation.

As apparent from FIG. 2, the body part 5 of the blind-end frame 3 will be inverted and turned inside out by the intrusion of the filter chamber 9. Then, the filter chamber 9 enters into the body part 5 to be stored inside the open frame 2 together with the blind-end frame 3.

As apparent from this contracted state, the container body 1 in the cup-like shape is reduced in height to a half, because it has been folded into substantially halves. At the same time, the entire filter chamber 9 is stored and enclosed inside the open frame 2.

In this embodiment, the open frame 2 and the blind-end frame 3 are designed to have heights of substantially a half of the container body 1 respectively. However, because the blind-end frame 3 is flexible and deformable as described above, the blind-end frame 3 may be made higher than the open frame 2, and the difference can be absorbed in a wrinkled manner thus decreasing the height of the open frame 2 substantially. In other words, by thus decreasing the height of the open frame 2, downsizing of the container body 1 in a folded state can be further promoted.

Although this downsizing may be restricted by a size of the filter chamber 9 to be stored, the filter device can be made flat by the folding operation, thus enabling the device to be easily stored and packed.

It is to be noted that the filter device according to the present invention will be packed, stored, transported or displayed in stores in such a collapsed and contracted state, that is, in a folded state. In this case, the filter device may be vacuum packed according to necessity for preventing the contents such as ground coffee or the like in the filter chamber 9 from deteriorating, or an appropriate measure for preventing deterioration, such as filling an inert gas may be taken.

Figure 3:
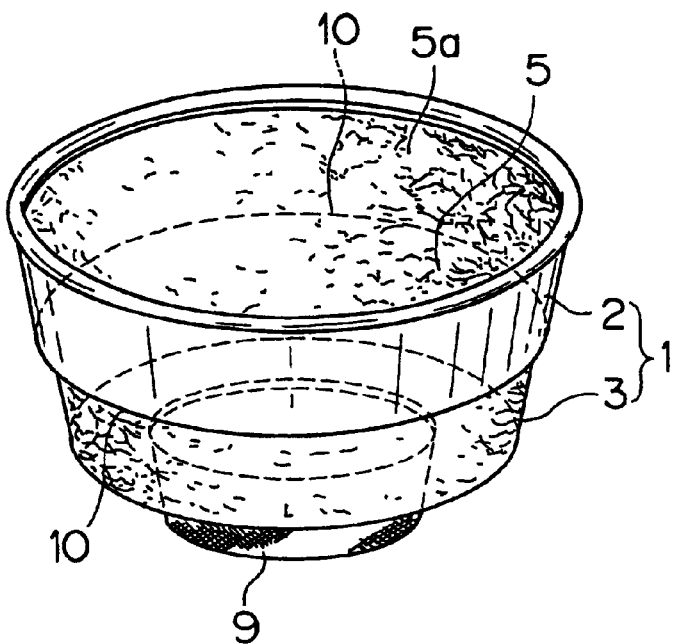
FIG. 3 is a perspective view of the filter device of FIG. 1 in a state expanded into a cup-like shape.
Figure 4:
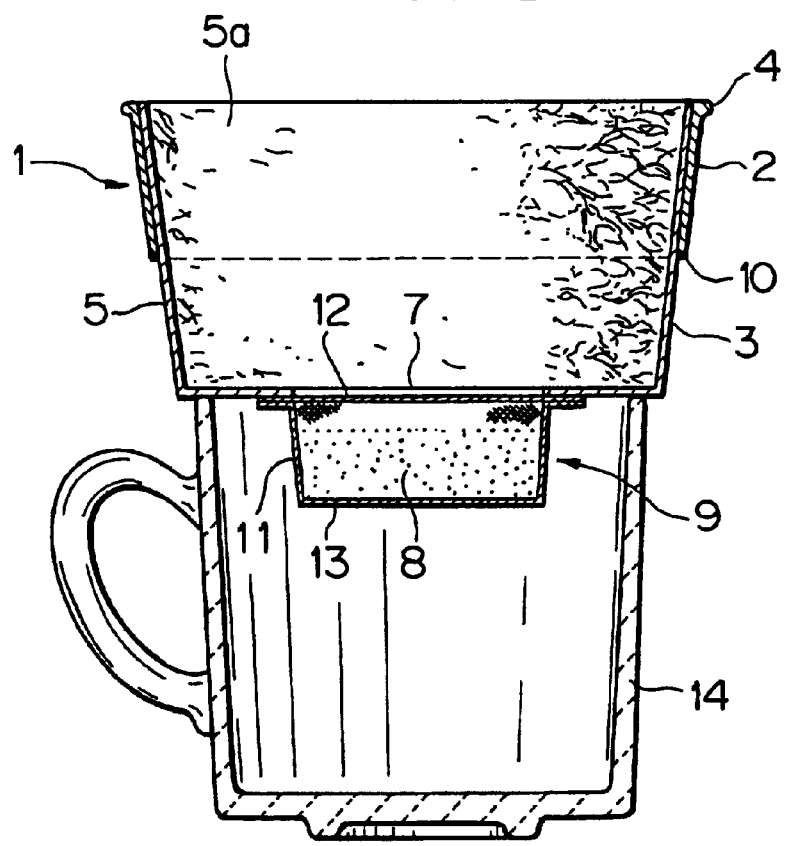
FIG. 4 is a sectional front view taken along a center line of the filter device of FIG. 1 for explaining a state in use.
Figure 5:
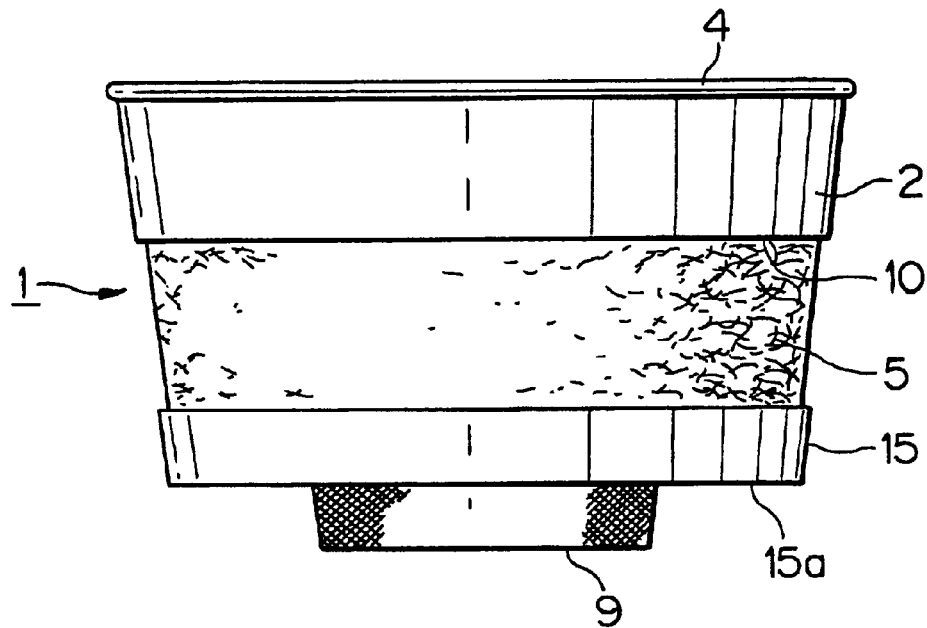
FIG. 5 is a front view of a filter device according to a second embodiment of the present invention.
Figure 6:
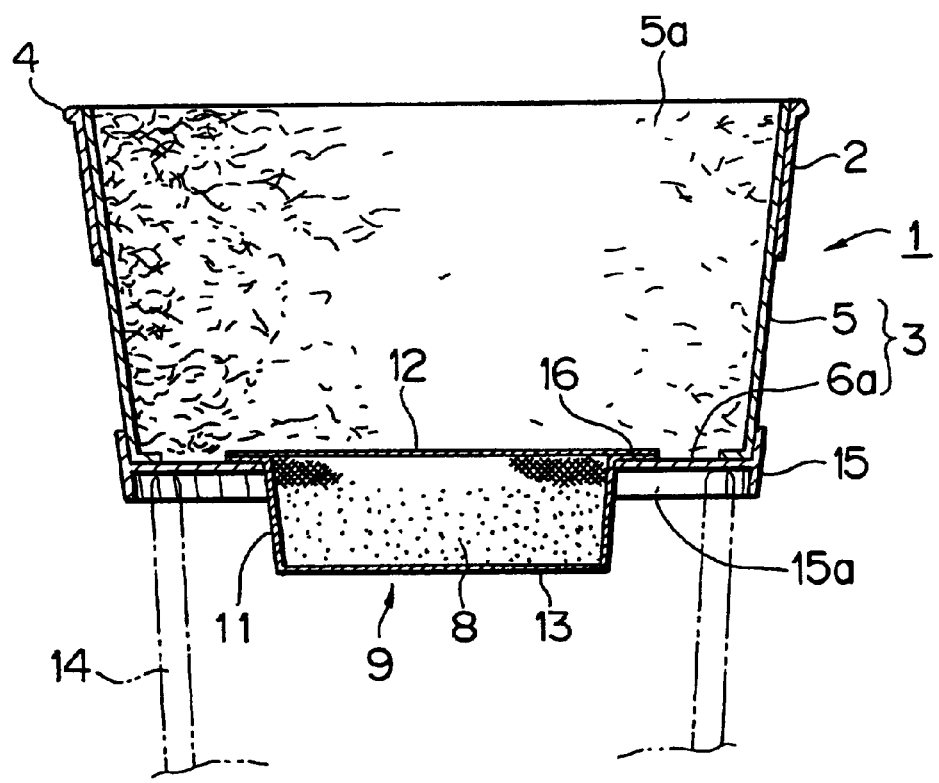
FIG. 6 is a sectional front view taken along a center line of the filter device of FIG. 5.

FIGS. 3 and 4 show the container body 1 which has been once contracted, in an expanded state like a cup for use.

This expansion can be conducted by holding the open frame 2 with one hand, and by pushing down the raised bottom 6 of the blind-end frame 3 by the other hand, or by pulling out the body part 11 of the filter chamber 9 which has been contained in the open frame 2.

As the bottom 6 of the blind-end frame 3 descends by the above described expanding operation, the body part 5 which has been turned back will move the folding line downward in an opposite direction to the occasion of folding, while recovering from the turned back state. In this manner, the container body 1 will be restored to the original cup-like shape. Then, the filter chamber 9 will be projected along with the expanding motion, into the state for use.

FIG. 4 shows the container body 1 placed on a coffee cup 14 and prepared for hot water to be poured. The container body 1 with the blind-end frame 3 pulled out serves to support the body part 5 of the blind-end frame 3 in a cylindrical shape by means of rigidity of the open frame 2, and to give tension to the bottom 6, thus enabling the entire container body 1 to be held in the cup-like shape.

When the hot water has been poured into the container body 1 placed on the coffee cup 14, the hot water will penetrate into the filter chamber 9 through the filter 12, and dampen the substance 8 such as ground coffee or the like enclosed therein. Then, coffee liquid will be recovered in the cup 14 through the lower filter 13, while extracting the ingredient of the ground coffee.

When the hot water has been poured, the container body 1 receives the whole weight of the hot water. At the same time, liquid pressure is exerted to the blind-end frame 3 from inside and put the body part 5 under tension, thus restraining the flexibility of the body part to stabilize the cup-like shape.

Second Embodiment

Referring to FIGS. 5 to 8, a filter device of a second embodiment according to the present invention will be described. In the description, the same parts and the same elements as in the first embodiment will be denoted with the same reference numerals, and further explanation will be omitted. Case will be the same in still further embodiments.

In this embodiment, the bottom 6 of the blind-end frame 3 constituting the container body 1 is formed of thick paper material having the same rigidity as the open frame 2.

In this embodiment, under the open frame 2 having desired rigidity, there is provided the body part 5 of the blind-end frame 3 in a cylindrical shape which is formed of deformable thin paper having shape retaining characteristic and suspended integrally from the open frame 2. In addition, a disc-like bottom plate 6a formed of thick paper is fixed to a lower end of the body part 5 in place of the aforesaid bottom 6. The bottom plate 6a is provided with a rising reinforcing frame 15 along its entire circumference.

The filter chamber 9 with a flange 16 is placed in the hole 7 formed in a center part of the bottom plate 6a, and integrally assembled by joining a lower face of the flange 16 to an upper face of the bottom plate 6a. The upper filter 12 is attached to the upper face of the flange 16 so as to enclose ground coffee in the filter chamber 9 in cooperation with the lower filter 13 for closing the bottom.

Figure 7:
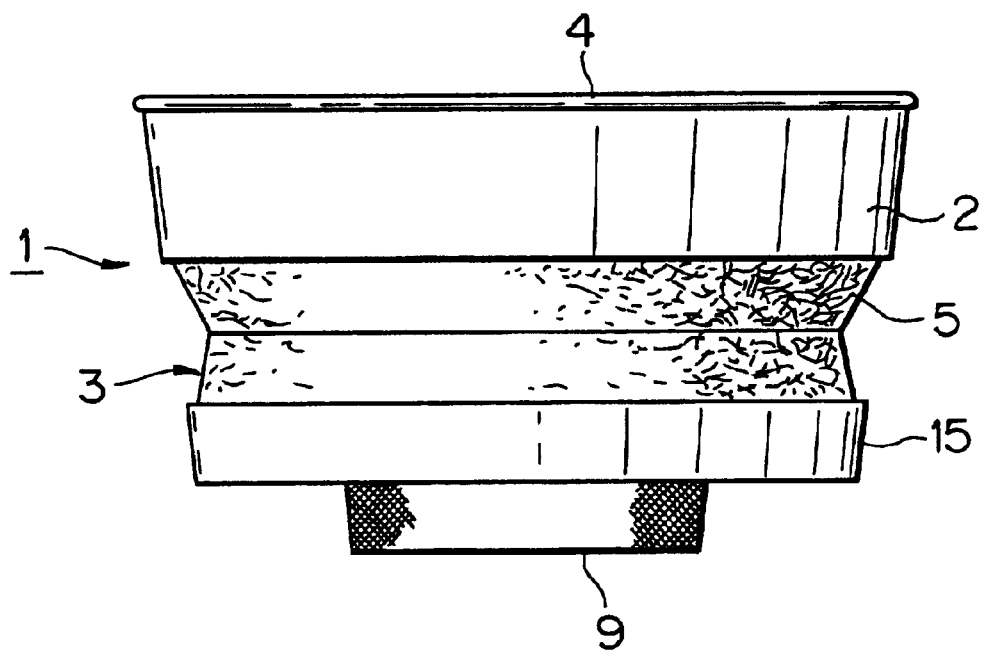
FIG. 7 is a front view of the filter device of FIG. 5 showing a middle stage of the folding operation.
Figure 8:
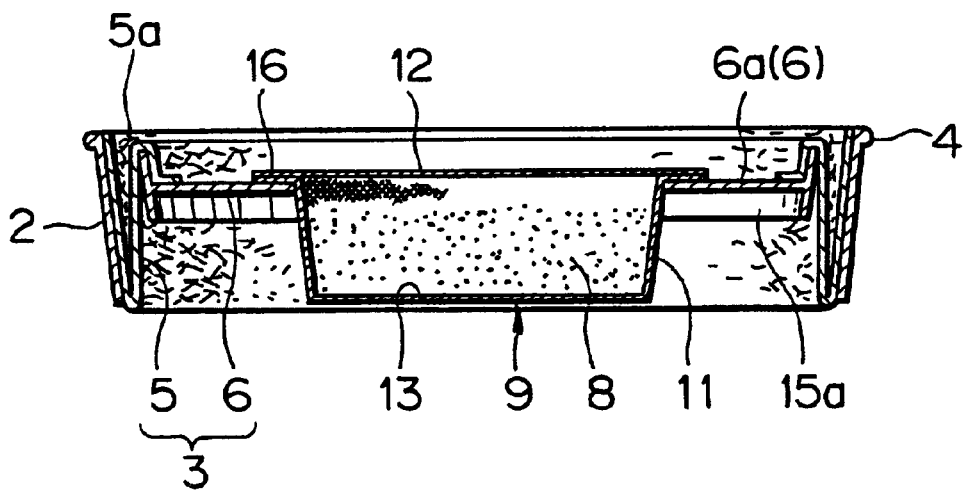
FIG. 8 is a sectional front view taken along a center line of the filter device of FIG. 5 in a folded state.

FIG. 7 shows the filter device having the above described structure at a middle stage of being folded to be contracted. FIG. 8 shows the filter device in a state where the filter chamber 9 is stored inside the open frame 2 together with the blind-end frame 3 which has been folded.

Contracting operation of the container body 1 is substantially the same as in the first embodiment, and can be performed by pushing up the bottom plate 6a while holding the open frame 2, or by pushing up the filter chamber 9.

Because the bottom of the blind-end frame 3 is formed of thick paper material having rigidity in this embodiment, deformation at the contraction will be exclusively performed in the body part 5. Since the upper and the lower ends of the body part 5 are supported by the open frame 2, the bottom plate 6a and the reinforcing frame 15, the folding motion will start at a center line of the body part 5 as shown in FIG. 7. Then, the blind-end frame 3 will be introduced into the open frame 2 while deforming its cylindrical shape.

On this occasion, the bottom plate 6a formed of thick paper material will guide the body part 5 to be folded along the whole circumference in cooperation with the reinforcing frame 15. Thus, the filter chamber 9 can be smoothly stored inside the open frame 2.

The body part 5 which has been flexed and deformed will be extended again when the filter chamber 9 has been completely stored as shown in FIG. 8, and firmly held inside the open frame 2 together with the filter chamber 9 by turning over both the upper and the lower ends of the body part 5.

The filter device according to the present invention which has been contracted as described above with the filter chamber 9 stored inside can be expanded again into a cup-like shape by pulling out the filter chamber 9 in the same manner as in the first embodiment. At the same time, the cylindrical shape of the body part 5 of the blind-end frame 3 can be maintained by means of the open frame 2 and the bottom plate 6a in this embodiment, and the shape can be stabilized.

In this embodiment, a lower edge of the reinforcing frame 15 provided at the lower end of the body part 5 is extended downward to form an annular cup holding frame 15a. When the filter device is mounted on the coffee cup 14, the holding frame 15a enables the filter device to be accurately positioned on the coffee cup 14 by engaging with an open edge of the coffee cup, and the filter device can be safely used without falling down while hot water is poured.

Third Embodiment

Figure 9:
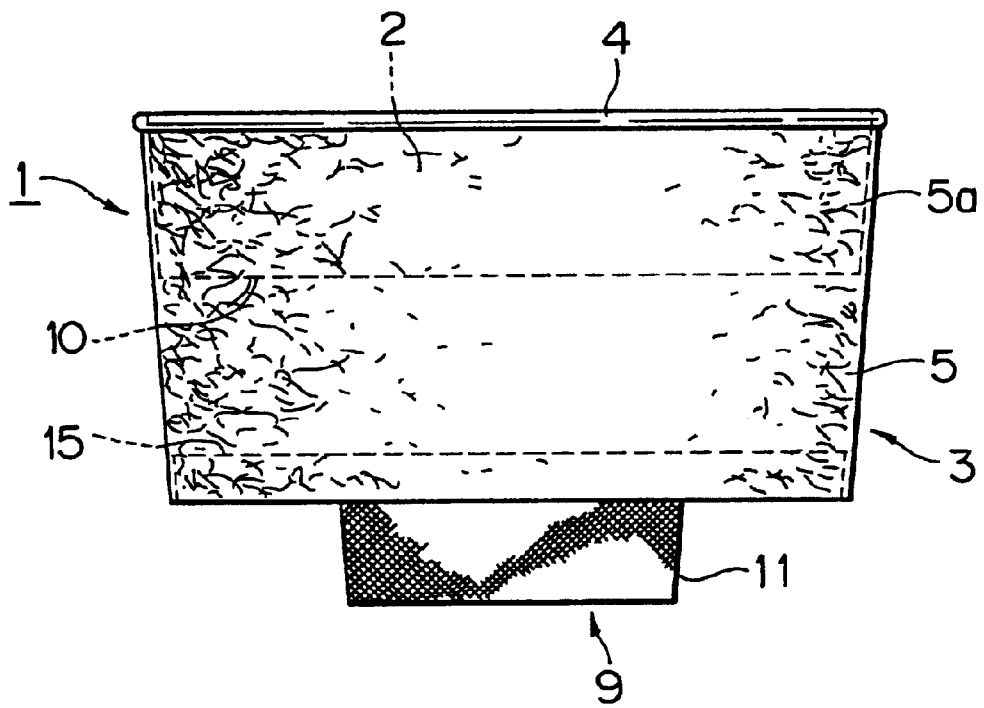
FIG. 9 is a front view of a filter device according to a third embodiment of the present invention.
Figure 10:
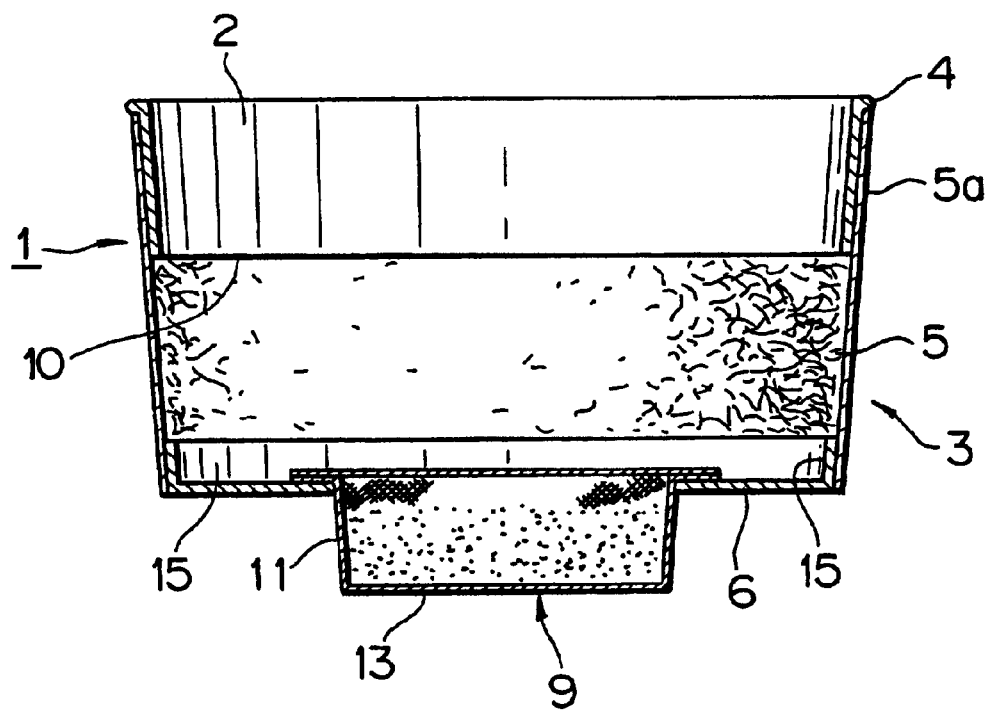
FIG. 10 is a sectional front view taken along a center line of the filter device of FIG. 9.
Figure 11:
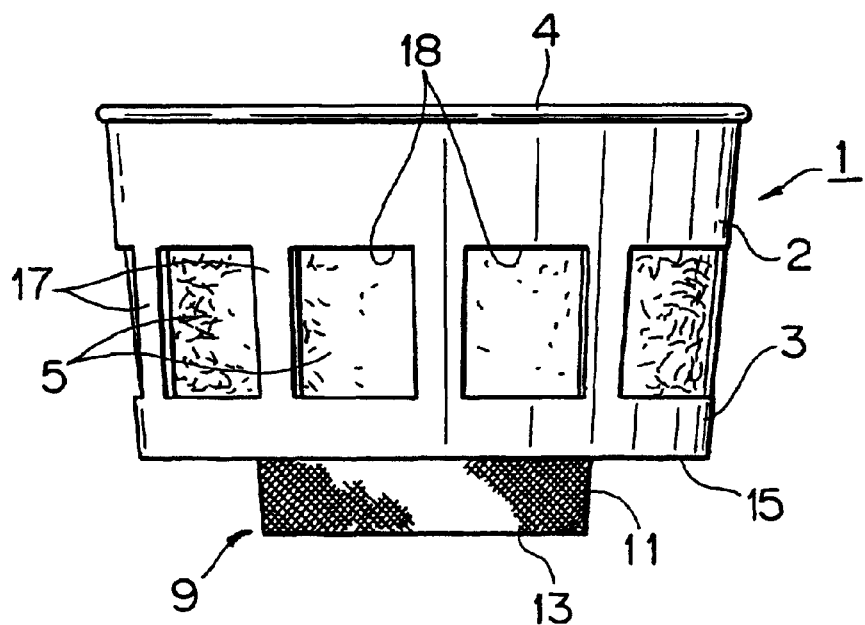
FIG. 11 is a front view of a filter device according to a fourth embodiment of the present invention in an expanded state suitable for use.

In a third embodiment of the present invention as shown in FIGS. 9 and 10, the blind-end frame 3 is formed of thin paper material in a cylindrical shape, and there is formed an extended portion 5a which extends from the upper edge of the body part 5 of the blind-end frame 3. The open frame 2 formed of thick paper is inserted into the extended portion 5a to be integrally joined to an inner face of the extended portion 5a. At the same time, the bottom 6 formed of thick paper and having the rising reinforcing frame 15 at its circumference is attached to the lower edge of the body part 5 in such a manner that the reinforcing frame 15 is joined to the inner face of the body part 5 thereby to compose the blind-end frame 3.

Although the third embodiment has the same effect as the second embodiment in respect that thick paper material is employed for the bottom 6 of the blind-end frame 3, the entire surface of the container body 1 is integral with the body part 5 of the blind-end frame 3 and shows homogeneous outer appearance as seen in the drawings. It is advantageous not only in aesthetic appearance but in possibility of applying patterns and prints to the surface.

Fourth Embodiment

FIGS. 11 to 14 show a fourth embodiment of the present invention. In this embodiment, the reinforcing frame 15 provided at the circumferential edge of the bottom plate 6a is connected to the open frame 2 by means of a plurality of connecting pieces 17. The bottom plate 6a, the reinforcing frame 15 and the open frame 2 are made integral by means of the connecting pieces 17. In other words, a plurality of windows 18 are formed by stamping, leaving the connecting pieces 17, in a lower half of the cup-shaped container body having the annular bottom plate 6a.

Figure 12:
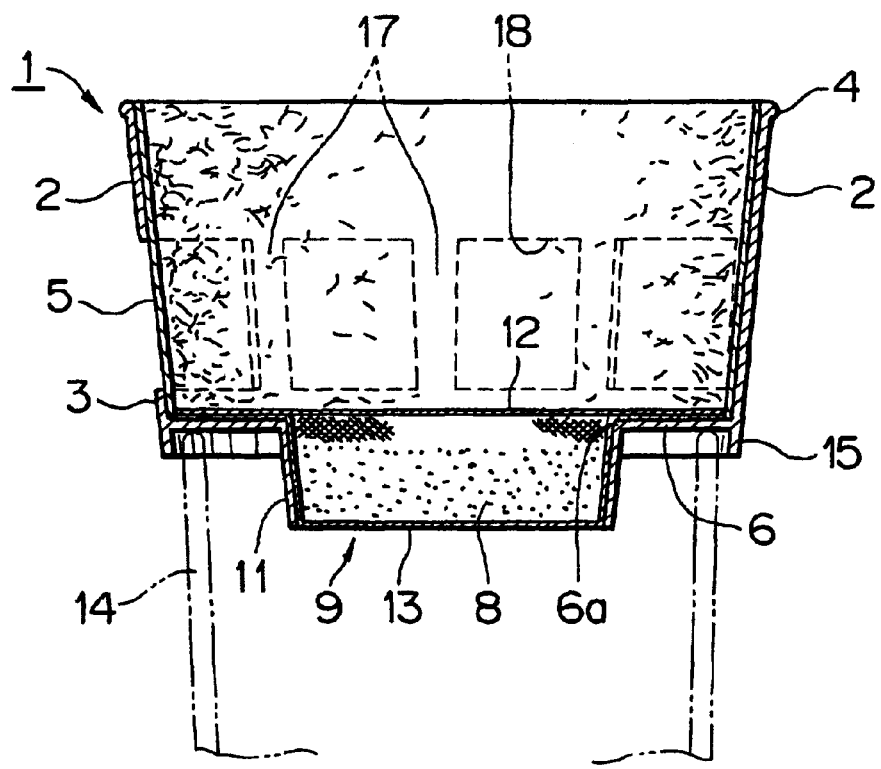
FIG. 12 is a sectional front view taken along a center line of the filter device of FIG. 11.
Figure 13:
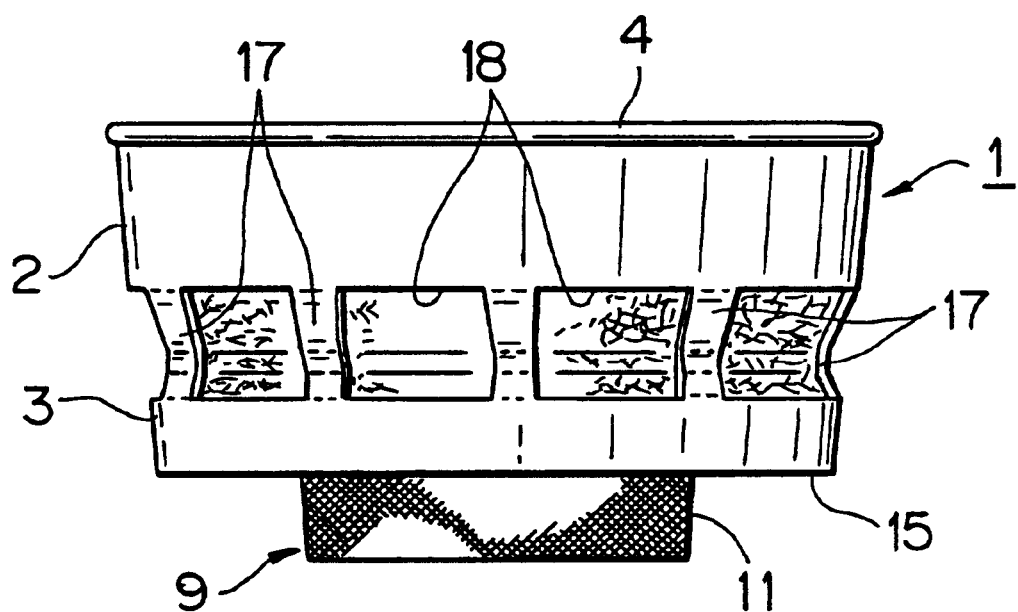
FIG. 13 is a front view of the filter device of FIG. 11 in which the device has started to be folded.
Figure 14:
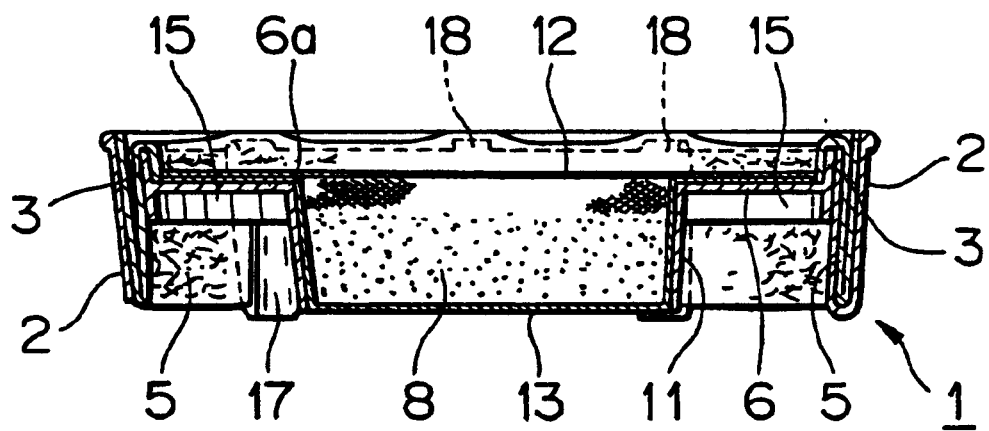
FIG. 14 is a sectional front view taken along a center line of the filter device of FIG. 11 in a folded state.

As shown in FIG. 12, the blind-end frame 3 which is flexibly deformable is attached to the inner peripheral face of the cup-shaped container body thereby to cover the windows 18 from the inside.

The connecting pieces 17 and the body part 5 corresponding to the positions of the windows 18 can be folded inside. When the container body 1 is pressed in a vertical direction, the connecting pieces 17 and the body part 5 are folded so that the blind-end frame 3 including the body part 5 and the filter chamber 9 may be enclosed inside the open frame 2 to contract the filter device. Accordingly, the filter device can be stored in a compact shape. For use, the filter chamber 9 and the blind-end frame 3 are pulled out to recover the cup-like shape. The method of making coffee is the same as in the above described embodiments. Other components including the filter chamber 9 are the same or equivalent to those in the previous embodiments in their structure and operation, and so, their description will be omitted to avoid overlaps.

It is apparent that all the elements in the first to the fourth embodiments can be substituted with one another and may be modified according to application.

In the aforesaid embodiments, thick paper has been employed as the material for the open frame 2 and the bottom (the bottom plate) 6, while thin paper has been employed as the material for the blind-end frame 3 particularly for its body part 5, in consideration of disposal of the filter device after use and easiness in handling the same. However, both the open frame and the blind-end frame can be made of non-woven fabric, for example, provided that it has rigidity enough to retain the shape as for the open frame, and it is easily deformable while retaining the shape as for the blind-end frame 3.

In case where the non-woven fabric is employed, thickness of the non-woven fabric may be varied for the open frame 2 and the blind-end frame 3 so that their rigidity may be different from each other. Specifically, the open frame 2 may have such a thickness as imparting rigidity and strength capable of gripping it with fingers, while the body part 5 may have such a thickness as imparting both flexibility capable of being deformed when the filter chamber 9 is pushed in, and shape retaining ability enough to keep the shape when expanded into a tubular shape.

Although it has been described above that the open frame may be formed of thick sheet material such as thick paper or thick non-woven fabric, and the blind-end frame 3 may be formed of thin sheet material such as thin paper or thin non-woven fabric, it has been only a conceptual expression. For example, the open frame 2 may be formed of thin material, irrespective of the thickness of the sheet material, provided that the necessary rigidity and strength can be assured.

In case of employing paper as the material, it is apparent that water proofing property is required.

Further, although the container body 1 is in a shape of a circular cup in the described embodiments, it is not limited to the circular shape, but may be in a polygonal shape for application.

The filter device according to the present invention is not limited to the coffee filter device as described in the embodiments, but can be optionally applied to any use according to the substance 8 contained in the filter chamber 9. Needless to say, it can be also utilized as a tea filter.

Although the present invention has been fully described by way of examples with reference to the accompanying drawings, it is to be noted that various changes and modifications can be made within a scope of the present invention.

What is claimed is:

1. A filter device for coffee or the like comprising:
   a container body consisting of an open flame formed of sheet material having predetermined rigidity, and a blind-end frame, including an annular bottom member, being joined with said open frame so as to be foldable into said open frame, said blind-end frame being formed of sheet material having predetermined flexibility; and
   a filter chamber for enclosing substance to be extracted, being mounted with a filter on said annular bottom member,
   wherein said blind-end frame is foldable into said open frame together with said filter chamber and said open frame provides a reinforcing structure that surrounds an outer upper portion of the blind-end frame when the filter is unfolded.

2. The filter device as claimed in claim 1, wherein said open frame is formed of sheet material having predetermined rigidity in a tubular shape, and said blind-end frame is formed of deformable sheet material in a tubular shape to which is given shape retaining characteristic having predetermined rigidity and flexibility.

3. The filter device as claimed in claim 1, wherein said container body has varied diameter gradually reduced from said open frame to said blind-end frame and is formed into a substantially inverted shape of a truncated cone.

4. The filter device as claimed in claim 1, wherein said open frame and said filter chamber have substantially the same height.

5. The filter device as claimed in claim 1, wherein said open frame and said blind-end frame have substantially the same height.

6. The filter device as claimed in claim 1, wherein said open frame, said blind-end frame and said filter chamber have substantially the same height.

7. The filter device as claimed in claim 1, wherein the height of said blind-end frame is substantially twice as high as the height of said open frame, and an upper half of said blind-end frame is attached to an inner peripheral face or an outer peripheral face of said open frame.

8. The filter device as claimed in claim 1, wherein a reinforcing frame having predetermined rigidity is formed at a circumferential edge of a bottom of said blind-end frame.

9. The filter device as claimed in claim 8, wherein said reinforcing frame is extended downward from said bottom of said blind-end frame thereby to integrally form a cup holding frame.

10. The filter device as claimed in claim 8, wherein said open frame and said reinforcing frame provided at said circumferential edge of said bottom are integrally connected by means of a plurality of connecting pieces.

11. The filter device as claimed in claim 1, wherein said bottom of said blind-end frame is formed of a bottom plate made of sheet material having predetermined rigidity.

12. The filter device as claimed in claim 1, wherein said open frame is formed of thick paper having predetermined rigidity, and a body part of said blind-end frame is formed of deformable thin paper provided with shape retaining characteristic having predetermined rigidity and flexibility.

13. The filter device as claimed in claim 1, wherein said open frame is formed of non-woven fabric having predetermined rigidity, and a body part of said blind-end frame is formed of deformable non-woven fabric provided with shape retaining characteristic having predetermined rigidity and flexibility.

14. A filter device for coffee or the like which is constructed;
   by forming an open frame in a short tubular shape of sheet material having predetermined rigidity,
   by extending a body part of a blind-end frame extending downward from a lower edge of said open frame thereby to form a cup-shaped container body, said blind-end frame being formed of deformable sheet material provided with shape retaining characteristic having predetermined rigidity and flexibility; and
   by continuously forming a filter chamber for enclosing substance to be extracted such as ground coffee in a bottom of said blind-end frame via a filter,
   wherein when it is not in use, said filter chamber is pushed into said open frame while said body part of said blind-end frame is flexed and deformed to fold and contract said blind-end flame, and when it is in use, said body part is flexed to expand said blind-end frame thereby enabling said container body to be expanded and restored to a cup-like shape, and said filter chamber to be pulled downward, said open frame providing a reinforcing structure that surrounds an outer upper portion of the blind-end frame when the filter is expanded.

15. The filter device as claimed in claim 14, wherein said container body has varied diameter gradually reduced from said open frame to said blind-end frame and is formed into a substantially inverted shape of truncated cone.

16. The filter device as claimed in claim 14, wherein said open frame and said filter chamber have substantially the same height.

17. The filter device as claimed in claim 14, wherein said open frame ad said blind-end frame have substantially the same height.

18. The filter device as claimed in claim 14, wherein said open frame and said filter chamber have substantially the same height, and said open frame and said blind-end frame have substantially the same height.

19. The filter device as claimed in claim 14, wherein an upper edge of said blind-end frame is connected to a lower edge of said open frame, and said upper edge of said blind-end frame is exited along an inner peripheral face of said open frame to be integrally joined thereto.

20. The filter device as claimed in claim 14, wherein an upper edge of said blind-end frame is connected to a lower edge of said open frame, and said upper edge of said blind-end frame is extended along an outer peripheral face of said open frame to be integrally joined thereto.

21. The filter device as claimed in claim 14, wherein an annular reinforcing frame of sheet material having predetermined rigidity is formed at a lower edge of said blind-end frame along its entire circumference.

22. The filter device as claimed in claim 21, wherein a lower end portion of said reinforcing frame is extended downward from said bottom of said blind-end frame thereby to integrally form a cup holding frame.

23. The filter device as claimed in claim 21, wherein said open frame and said reinforcing frame provided at said circumferential edge of said bottom are integrally connected by means of a plurality of connecting pieces.

24. The filter device as claimed in claim 14, wherein said bottom of said blind-end frame is formed of a bottom plate made of sheet material having predetermined rigidity.

25. The filter device as claimed in claim 24, wherein an annular reinforcing frame of sheet material having predetermined rigidity is formed at a lower edge of said blind-end frame along its entire circumference.

26. The filter device as claimed in claim 25, wherein a lower end portion of said reinforcing frame is extend downward from said bottom of said blind-end frame thereby to integrally form a cup holding frame.

27. The filter device as claimed in claim 25, wherein said open frame and said reinforcing frame provided at said circumferential edge of said bottom are integrally connected by means of a plurality of connecting pieces.

28. The filter device as claimed in claim 14, wherein said open frame is formed of thick paper having predetermined rigidity, and said body part of said blind-end frame is formed of deformable thin paper provided with shape retaining characteristic having predetermined rigidity and flexibility.

29. The filter device as claimed in claim 28, wherein an annular reinforcing frame of sheet material having predetermined rigidity is formed at a lower edge of said blind-end frame along its entire circumference.

30. The filter device as claimed in claim 29, wherein a lower end portion of said reinforcing frame is extended downward from said bottom of said blind-end frame thereby to integrally form a cup holding frame.

31. The filter device as claimed in claim 29, wherein said open frame and said reinforcing frame provided at said circumferential edge of said bottom are integrally connected by means of a plurality of connecting pieces.

32. The filter device as claimed in claim 14, wherein said open frame is formed of non-woven fabric having predetermined rigidity, and said body part of said blind-end frame is formed of deformable non-woven fabric provided with shape retaining characteristic having predetermined rigidity and flexibility.

33. The filler device as claimed in claim 32, wherein an annular reinforcing frame of sheet material having predetermined rigidity is formed at a lower edge of said blind-end frame along its entire circumference.

34. The filter device as claimed in claim 33, wherein a lower end portion of said reinforcing frame is extended downward from said bottom of said blind-end frame thereby to integrally form a cup holding frame.

35. The filter device as claimed in claim 33, wherein said open frame and said reinforcing frame provided at said circumferential edge of said bottom are integrally connected by means of a plurality of connecting pieces.

* * * * *